(12) United States Patent
Schalla et al.

(10) Patent No.: US 8,667,754 B2
(45) Date of Patent: Mar. 11, 2014

(54) COMPOSITE TIE ROD AND METHOD FOR MAKING THE SAME

(75) Inventors: James P. Schalla, Edmonds, PA (US); Dennis C. Lin, Shoreline, WA (US); Phillip J. Bobzien, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1124 days.

(21) Appl. No.: 12/198,753

(22) Filed: Aug. 26, 2008

(65) Prior Publication Data

US 2010/0055383 A1 Mar. 4, 2010

(51) Int. Cl.
 *B32B 1/00* (2006.01)
 *D02G 3/02* (2006.01)

(52) U.S. Cl.
 USPC ............... 52/362; 52/831; 52/633; 52/650.1; 52/651.11

(58) Field of Classification Search
 USPC ................. 52/362, 831, 633, 650.1, 651.11
 See application file for complete search history.

(56) References Cited

U.S. PATENT DOCUMENTS

| | | |
|---|---|---|
| 3,850,722 A | 11/1974 | Kreft |
| 4,038,885 A | 8/1977 | Jonda |
| 4,137,354 A | 1/1979 | Mayes, Jr. et al. |
| 4,292,368 A | 9/1981 | Mialon |
| 4,693,140 A | 9/1987 | Stephan et al. |
| 4,841,801 A | 6/1989 | Tice |
| 5,611,636 A | 3/1997 | Flory |
| 5,921,048 A | 7/1999 | Francom et al. |
| 7,132,027 B2 | 11/2006 | Jensen |
| 7,195,417 B2 | 3/2007 | Shiao et al. |
| 2004/0247866 A1 | 12/2004 | Jensen |
| 2005/0115186 A1* | 6/2005 | Jensen et al. ............... 52/633 |
| 2006/0019759 A1 | 1/2006 | Shiao et al. |
| 2010/0054856 A1 | 3/2010 | Schalla et al. |

FOREIGN PATENT DOCUMENTS

| | | |
|---|---|---|
| DE | 3229064 A1 | 3/1983 |
| DE | 3641632 A1 | 6/1988 |
| DE | 4135695 A1 | 4/1993 |
| EP | 0149979 A2 | 7/1985 |
| EP | 1065422 A1 | 1/2001 |
| EP | 1798429 A1 | 6/2007 |
| WO | 2010024990 A1 | 3/2010 |
| WO | 2010024994 A1 | 3/2010 |

OTHER PUBLICATIONS

International Search Report dated Oct. 21, 2009, regarding Application No. PCT/US2009/051592 (WO2010014490), 3 pages.
International Search Report dated Oct. 29, 2009, regarding Application No. PCT/US2009/051718 (WO20100024994), 3 pages.
PCT Application No. PCT/US2009/051592, filed Jul. 23, 2009, 26 pages.
USPTO PCT Application No. PCT/US2009/051718, filed Jul. 24, 2009, 26 pages.
USPTO Office Action, dated Mar. 25, 2010, regarding U.S. Appl. No. 12/198,783. 15 pages.
USPTO Final Office Action, dated Sep. 15, 2010, regarding U.S. Appl. No. 12/198,783, 12 pages.

* cited by examiner

*Primary Examiner* — Brent O'Hern
(74) *Attorney, Agent, or Firm* — Yee & Associates, P.C.

(57) ABSTRACT

A composite tie rod comprises an open lattice body formed of interlaced filaments held in a solid matrix. A pair of fittings rigidly connect rod ends with the ends of the body. The rod ends form attachment points on the tie rod.

9 Claims, 11 Drawing Sheets

COMPOSITE TIE ROD AND METHOD FOR MAKING THE SAME

CROSS REFERENCE TO RELATED APPLICATIONS

This application is related to co-pending U.S. patent application Ser. No. 12/198,783, filed concurrently herewith on Aug. 26, 2008, which is incorporated by reference herein in its entirety.

TECHNICAL FIELD

This disclosure generally relates to a composite tie rod having an open lattice body formed of interlaced filaments, and deals more particularly with fittings used to attach rod ends to the body that form attachment points

BACKGROUND

A variety of slender connecting members have been developed to transmit tensile and/or compressive loads between structures. These members may comprise an elongate body having a fixed or adjustable fitting on each end thereof forming the points where the member may be attached to structures. For example, in the aircraft industry, tie rods may be used for mounting and supporting overhead storage bins, lavatories, galleys, ceilings, equipment racks, etc. Typical tie rods used in aircraft may comprise a hollow cylinder formed of metal such as aluminum, or a composite material such as carbon fiber epoxy. The cylinder includes tapered ends provided with attachment fittings formed of metal or composite material, depending upon the application.

The tie rods described above used in aircraft applications are effective, durable and relatively lightweight. However, since several hundred tie rods may be used in a typical commercial or military aircraft, any reduction in tie rod weight may represent a significant overall weight reduction in the aircraft.

Composite members used to transmit tensile or compressive loads are known in which an open lattice structural shell is formed by interlacing longitudinal and helical filaments that form a truss-like grid. The longitudinal filaments primarily carry axial and bending loads, while the helical filaments both stabilize the longitudinal filaments and carry both torsion and transverse shear forces. Bundles of the filaments are held in a resin matrix, which after curing, form strong, lightweight, stiff structural members.

A problem exists in utilizing the lightweight open lattice composite body described above for tie rod and/or strut applications because of the difficulty of attaching the ends of the tie rod/strut to the individual filaments at the end of the body, either before or after curing.

Accordingly, there is a need for a composite tie rod having a lightweight, open lattice body that includes fittings allowing either conventional or unique tie rod ends to be connected to the body. There is also a need for a method of producing these tie rods and the related fittings.

SUMMARY

In accordance with the disclosed embodiments, a composite tie rod and a related method for making the same employ an open lattice tie rod body formed of interlaced filaments held in a solid matrix. Rod ends forming attachment points are rigidly connected to the body by fittings that allow the use of a variety of types of rod ends for a given size body or family of bodies. The open lattice, truss-like nature of the body may materially reduce tie rod weight.

According to one disclosed embodiment, a composite tie rod comprises: an open lattice body formed of interlaced filaments held in a solid matrix; a pair of rod ends each forming an attachment point on the tie rod; and, a pair of fittings for rigidly connecting the rod ends respectively with the ends of the body. In one example, at least certain of the filaments extend beyond the ends of the body and are secured to the fittings by clamping the filaments. In another example, the filaments are connected to the fittings by threading or weaving the filaments through openings in the fittings. The fitting may include an insert for receiving and holding a rod end.

According to another disclosed embodiment, a tie rod comprises: a composite body having first and second ends, the composite body being formed of continuous filaments held in a rigid matrix and interlaced to form an open lattice; a pair of rod ends each forming an attachment point on the tie rod; and, a pair of fittings rigidly connecting the rod ends respectively with the first and second ends of the body, each of the fittings including a section extending generally parallel to the central axis of the body and overlapping an area of the body, the overlapping section being fastened to the body. The body may include filaments that are wrapped around the overlapping section of the fitting. Each of the fittings may include a tapered section between the rod end and the overlapping section of the fitting. The tapered section of the fitting may include a threaded hole for receiving rod end. In one example, each of the fittings may include a pair of spaced apart plates around which the filaments are wrapped and a second end that forms a clevis defining an attachment point on the tie rod.

According to a further embodiment, a tie rod comprises: a composite body having first and second ends, the composite body being formed of continuous filaments held in a rigid matrix and interlaced to form an open lattice; and, a pair of rod ends respectively on the first and second ends of the body, each of the rod ends including first and second members, each of the first and second members including a first end having at least certain of the filaments wrapped there around and fixing the member to the body, and a second end. The second end of each of the members may include a feature forming an attachment point on the tie rod.

According to a disclosed method embodiment, producing a composite tie rod comprises: forming an open lattice composite body, including interlacing continuous filaments held in a matrix; and, securing a fitting on each end of the body by fastening at least certain of the filaments to the fitting. The method may further comprise securing a rod end on each of the fittings that forms an attachment point on the tie rod. Securing the fitting may include clamping certain of the filaments within the fitting, weaving the filaments into the fitting or wrapping the filaments around the fitting.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
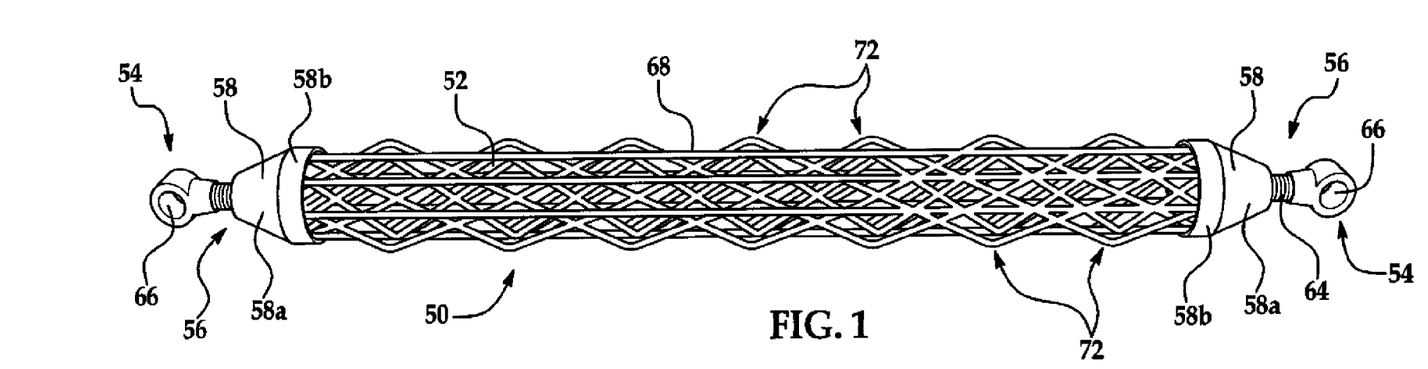
FIG. 1 is a perspective illustration of a composite tie rod having an open lattice body.
Figure 2:
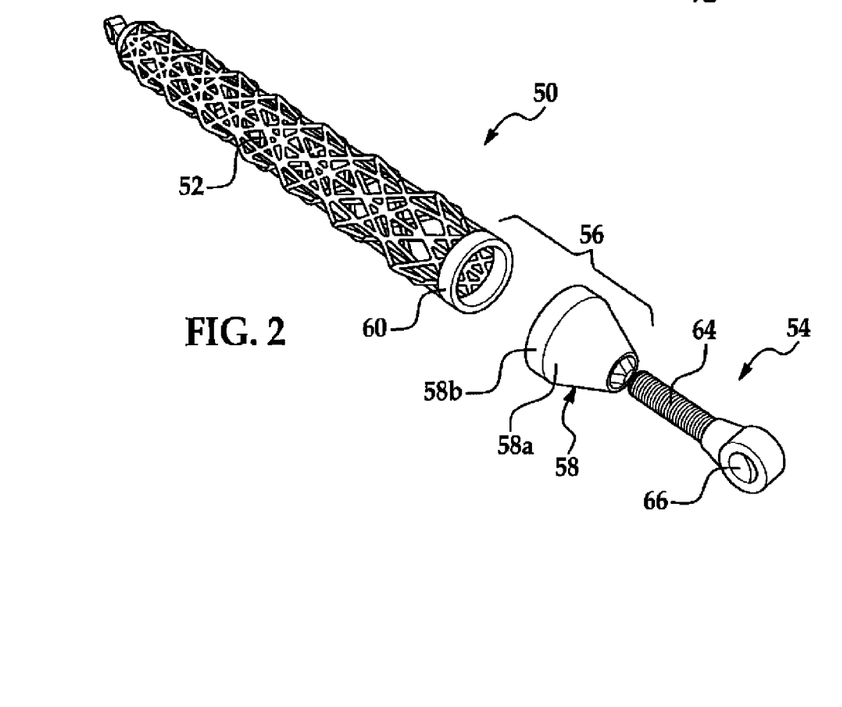
FIG. 2 is an exploded, perspective view of one end of the tie rod shown in FIG. 1.
Figure 3:
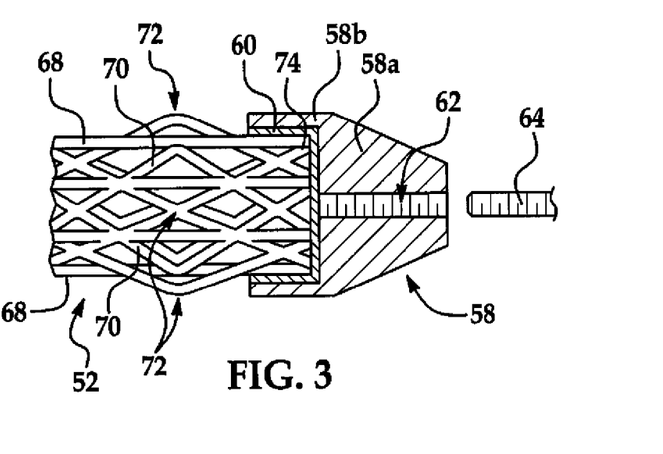
FIG. 3 illustrates one end of the tie rod shown in FIGS. 1 and 2, wherein the fitting is shown in cross section.

Referring first to FIGS. 1-3, a composite tie rod generally indicated by the numeral 50 comprises an elongate, generally cylindrical body 52 having its opposite ends rigidly connected to rod ends 54 by fittings 58. As used herein, "tie rod" is not limited to components that transmit tensile loads, but is defined more broadly to include a wide range of structural members such as connecting rods, struts, links and the like, which are typically elongate, and are intended to transmit loads in compression and/or tension.

The body 52 is an open lattice, grid-like shell formed from interlaced longitudinal members 68 and helical members 70. The helical members 70 may intersect to form nodes 72 along the length of the body 52. Members 68, 70 may comprise bundles of continuous filaments held in a resin matrix, such as carbon fiber reinforced epoxy, which are cured to form lightweight, stiff, high strength structural components. As used herein, "filaments" will refer to the members 68, 70 prior to curing, in which they are flexible, and therefore may be wound, wrapped, or otherwise arranged in desired configurations during a fabrication process. The filaments may be arranged as tows comprising an untwisted bundle or yarn of generally parallel continuous filaments, such as carbon fiber filaments.

The longitudinal and helical members 68, 70 may be interlaced in various manners to form open lattice structures of other configurations that suit differing structural applications. As used herein, "lattice", "lattice-work" and "open lattice structures" encompass a wide range of structures formed of individual elements joined together in a grid-like or lattice-like pattern to form a structure. One example of an open lattice structural member, disclosed in U.S. Pat. No. 5,921,048, has an enhanced load bearing capacity per unit mass and is capable of withstanding multiple loadings. A suitable process for fabricating such a member is described in U.S. Pat. No. 7,132,027, wherein continuous resin impregnated fibers are wrapped around a mandrel or die and later cured to form a rigid, truss-like structure.

As previously noted, the tie rod 50 may transmit either, or both, tensile and compressive loads between structures (not shown) to which the rod ends 54 are attached. The ability of the tie rod 50 to transmit tensile or compressive loads may depend on the design of the fitting 56. Some fitting designs may render the tie rod 50 suitable for transmitting substantially only tensile loads, while other designs may allow the tie rod to transmit substantially only compressive loads. Still other fitting designs may allow the tie rod 50 to transmit both tensile and compressive loads. Additionally, depending upon the interlaced geometry of the members 68, 70, the body 52 may withstand some degree of side impact loading as well.

Each of the fittings 56 comprises a cone 58 and a cap 60. The cap 60 is generally cylindrical in shape and covers an end of the body 52. The cap 60 may be formed of plastic thermoset or other plastic materials and may be either bonded to or co-cured with the body 52. The cap 60 provides a means of attaching the cone 58 to the body 52. The cone 58 includes a tapered solid portion 58a and a cylindrical hollow portion 58b sleeved over and bonded to the cap 60. The tapered solid portion 58a may be formed of a stiff, rigid material such as metal or a composite and includes a threaded central bore 62 for receiving the threaded shank 64 of the rod end 54. The rod end 54 may be of a conventional construction that includes an eye 66 forming an attachment point on the tie rod 50. The use of a conventional rod end 54 may allow for any minor axial and/or longitudinal misalignment that might exist between the tie rod 50 and a structure (not shown) to which the tie rod 50 is attached. As will be discussed below, other various other types of conventional rod ends may be used in connection with the disclosed embodiments, such as later described clevis-type rod ends.

Figures 4, 5:
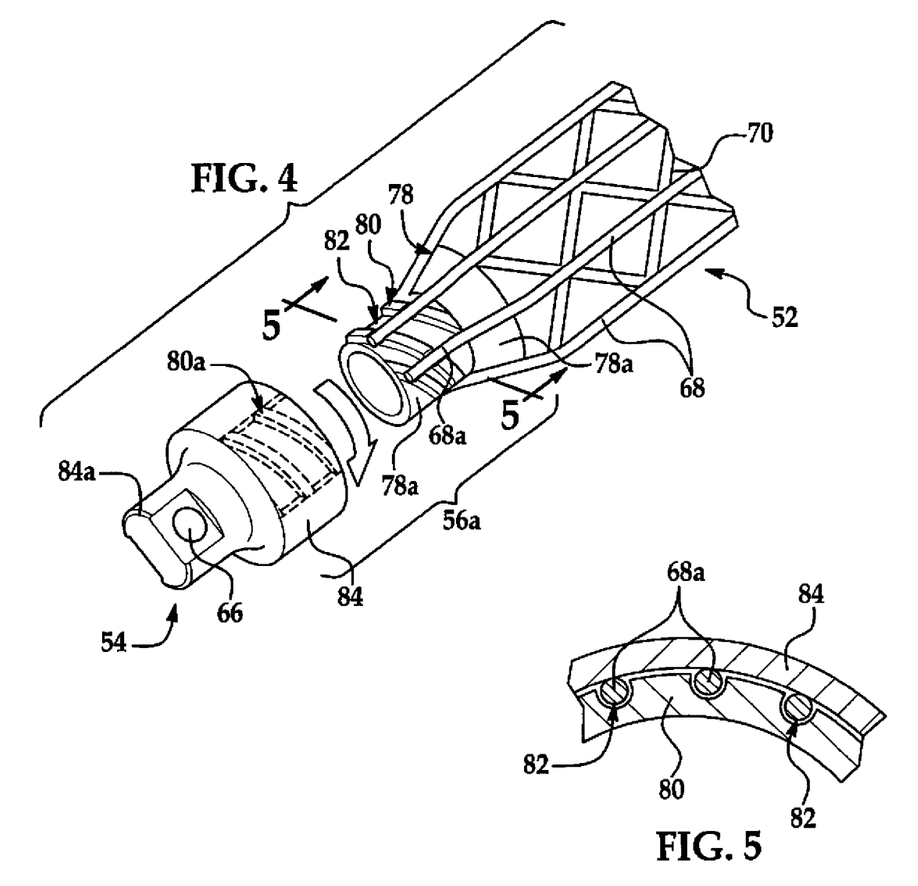
FIG. 4 is an exploded perspective illustration of an alternate embodiment.
FIG. 5 is a sectional illustration taken along the line 5-5 in FIG. 4.

Attention is now directed to FIGS. 4 and 5 which depict an alternate form of the fitting 56a broadly comprising a metal insert 78 and a metal cap 84. The insert 78 includes an outer cylindrical portion 78a that transitions into a cone shaped portion 78b disposed within the end of the body 52. The cylindrical portion 78a of the insert 78 includes a set of threads 80 that match threads 80a formed within the cap 84. The cap 84 further includes an integrally formed extension 84a provided with an eye 66 forming a rod end 54. The cylindrical portion 78a of the insert 78 includes a set of circumferentially spaced, longitudinally extending grooves 82 therein. The longitudinal filaments 68 extend beyond the end of the body 52 to form filament extensions 68a that are respectively received within the grooves 82. In use, the cap 84 is screwed onto the threaded cylindrical portion 78a of the insert 78. A suitable bonding agent (not shown) may applied to the threaded cylindrical portion 78a before the cap 84 is screwed onto the threaded cylindrical portion 78a.

As the cap 84 is screwed onto the insert 78, the filament extensions 68a are captured and mechanically held between the cap 84 and the insert 78. Following curing of the body 52, the mechanical connection between the filament extensions 68a and the fitting 56a rigidly connects the rod ends 54 to the body 52.

Figure 6:
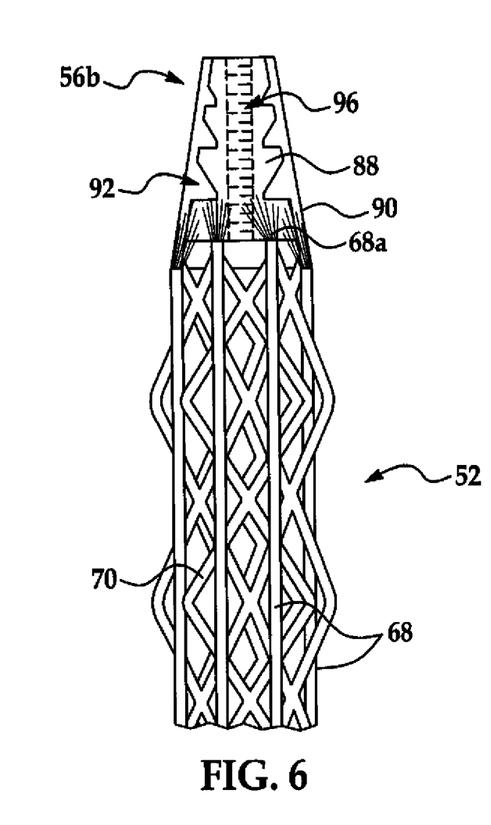
FIG. 6 is a side view illustrating one end of another embodiment of the tie rod.

FIG. 6 depicts another form of the fittings 56b in which the body 52 is connected with a rod end (not shown) using a mechanical connection between the body 52 and the fitting 56b. In this example, filament extensions 68a at the ends of both the longitudinal and helical member 68, 70 respectively are spread out over the outer surface of a tapered metal insert 88. The outer surface of the insert 88 also includes a set of circular steps 92. The filament extensions 68a follow the step contours of the insert 88 and may be cured in place. A threaded bore 96 in the insert 88 allows a rod end 54 (see FIG. 2) to be threaded into the end of the fitting 56b.

Figure 7:
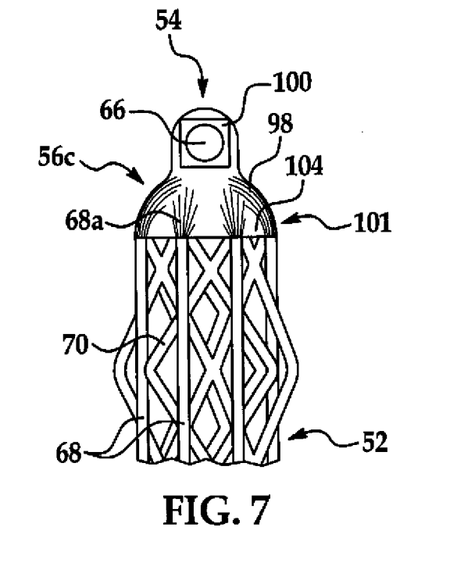
FIG. 7 is a side view illustrating one end of another embodiment of the tie rod.

FIG. 7 illustrates another form of the fitting 56c which includes a unitary insert 98 formed of plastic, metal or other materials, and having an integrally formed rod end 54. The insert 98 has a lower, dome shaped surface 104 integrally formed with an extension 100 in which an attachment eye 66 is provided. The insert 98 may be formed of a plastic resin material that may be reinforced with fibers. In this example, the filament extensions 68a are spread out and over the dome shape surface 104, and are co-cured with the insert 98 to provide a rigid connection between the body 52 and the rod end 54.

Figure 8:
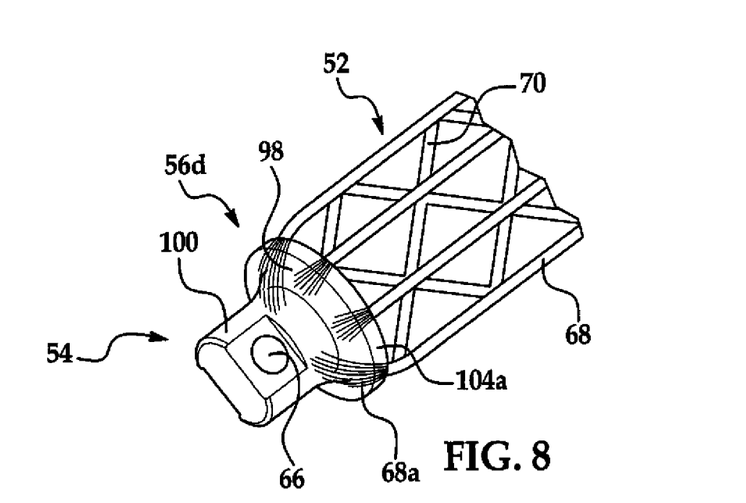
FIG. 8 is a perspective view illustrating one end of another embodiment of the tie rod.

FIG. 8 illustrates another fitting 56d which is similar to that shown in FIG. 7, but wherein one end of the insert 98 includes an integrally formed, hoop-like ring 104a within the end of the body 52 in order to provide the end of the body 52 with additional hoop strength.

Figure 9:
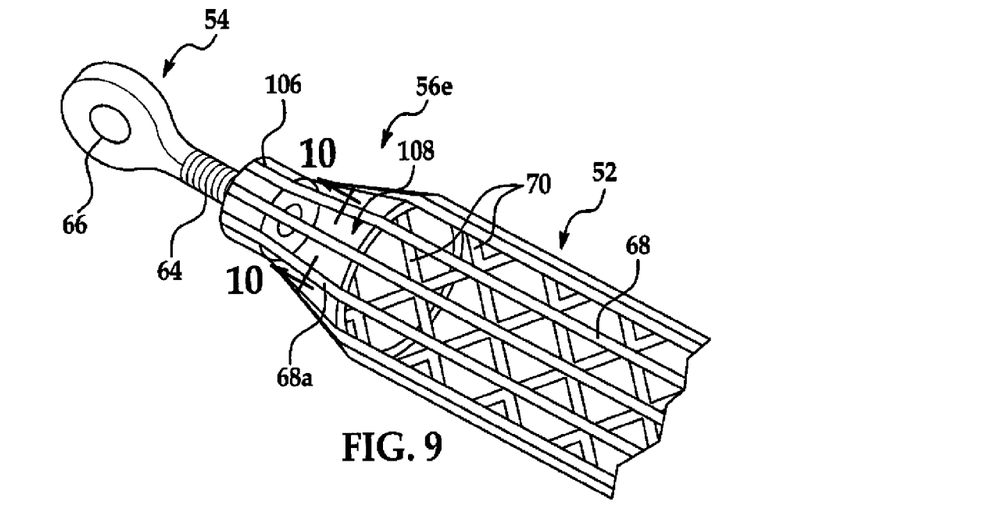
FIG. 9 is a perspective illustration of one end of another embodiment of the tie rod.
Figure 10:
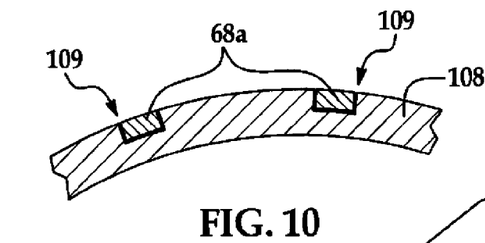
FIG. 10 is a sectional view taken along the line 10-10 in FIG. 9.

Attention is now directed to FIGS. 9 and 10 which depict a further form of the fitting 56e. Fitting 56e includes a cone shaped insert 108 which may be formed from metal or a reinforced plastic resin such as carbon fiber epoxy. The cone shaped insert 108 includes a plurality of longitudinally extending receiver grooves 109 therein which respectively receive the filament extensions 68a forming part of the longitudinal members 68. The filament extensions 68a may be bonded within the receiver grooves 109, and a metal insert 106 within the cone 108 receives and mounts the rod end 54.

Figures 11, 11A:
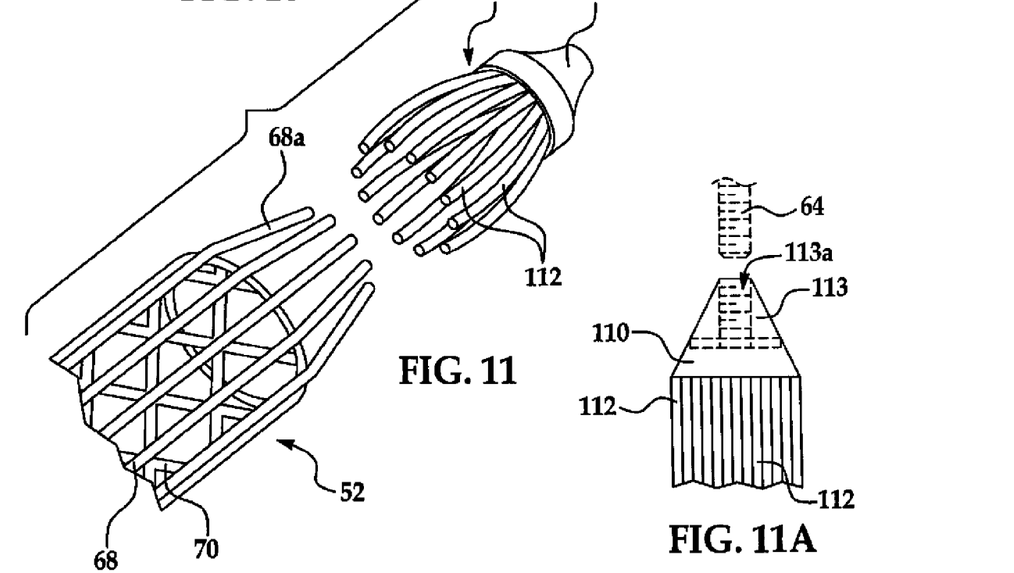
FIG. 11 is an exploded perspective illustration of a further embodiment of the tie rod.
FIG. 11a is a side view illustration of the fittings shown in FIG. 11.

Referring now to FIGS. 11 and 11a, in another embodiment, the fitting 56f may include a tapered member 110 formed of plastic resin, such as a thermoset plastic which may or may not contain a reinforcement. The tapered member 110 includes a plurality of fingerlike bundles 112 of pre-impregnated fiber filaments which are laid up in overlapping relationship to and co-cured with filament extensions 68a on the body 52. Co-curing of the overlapping filament extension 68a and filament bundles 112 form a rigid connection between the body 52 and the cone shaped member 110. As shown in FIG. 11a, a metal insert 113 provided with a threaded opening 113a may be inserted within the member 110 in order to receive and mount the threaded shank 64 of a rod end 54.

Figure 12:
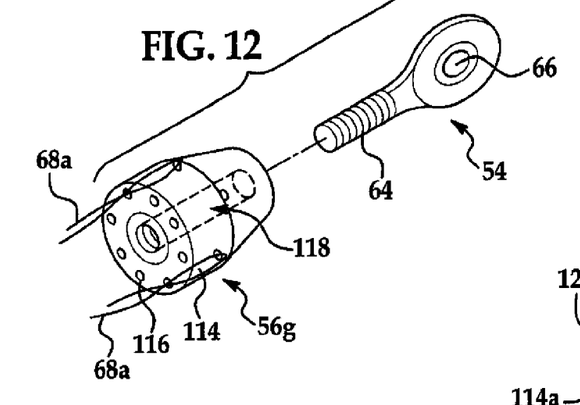
FIG. 12 is an exploded, perspective illustration of another embodiment of the tie rod.

Another embodiment of the fitting 56g is shown in FIG. 12. A tapered fitting member 114 formed of metal and/or composite materials has a central threaded bore 118 for receiving the threaded shank 64 of a rod end 54 provided with an attachment eye 66. Member 114 may be provided with a plurality of longitudinally extending bores 116 through which the filament extensions 68a may be threaded in order to join the metal member 114 to the end of the body 52.

Figure 13:
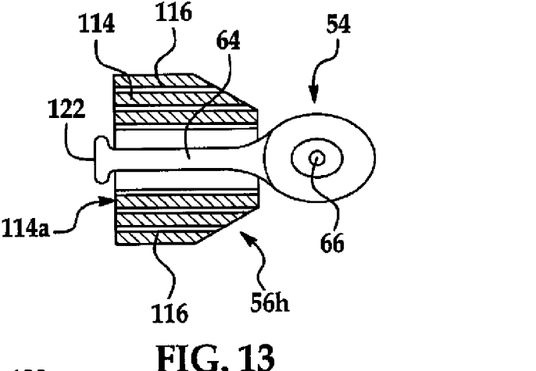
FIG. 13 is a sectional view illustrating an alternate means for installing the rod end in the fitting shown in FIG. 12.

FIG. 13 illustrates another form of the fitting 56h similar to fitting 56g where the rod end 54 is rigidly held within the member 114, and is therefore may not be adjusted. This rigid connection may be achieved by swaging the end 122 of the shank 64 at the bottom 114a of the member 114.

Figure 14:
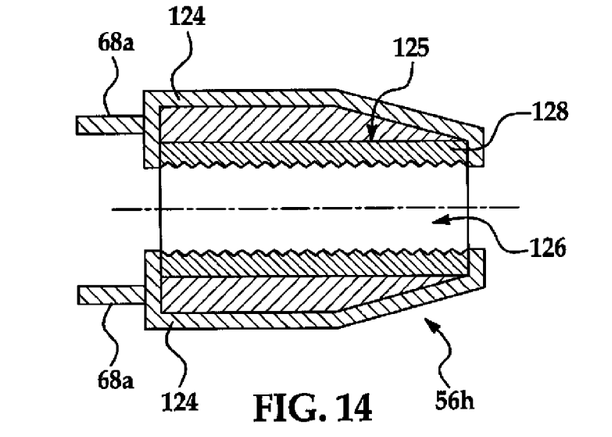
FIG. 14 is a sectional illustration of another embodiment of a fitting.
Figure 15:
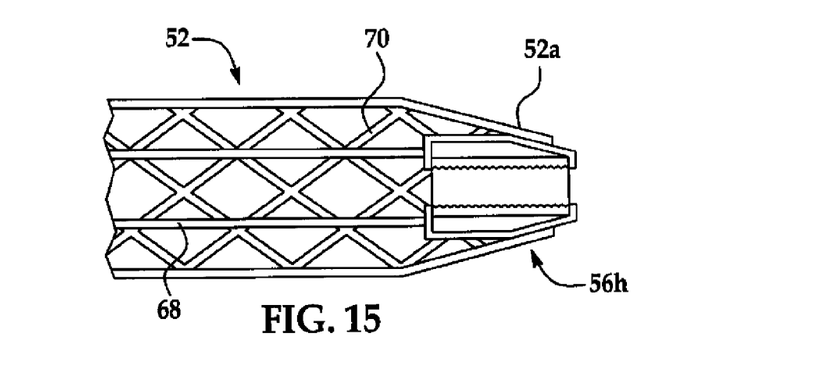
FIG. 15 illustrates a further embodiment of a fitting.

Attention is now directed to FIGS. 14 and 15 wherein a further form the fitting 56h is depicted. Fitting 56h includes an outer plastic resin ring 124 having a central bore that 125 receives a cylindrical metal cylinder 128. The cylinder 128 is provided with a threaded bore 126 coaxial with the bore 125 of the ring 124. The filament extensions 68a may be threaded through or may be molded within the plastic resin ring 124. When the plastic ring 124 is cured, the filament extension 68a is co-cured with the plastic resin of the ring 124, thereby securely fixing the body 52 to the fitting 56h. A rod end 54 (not shown) may be threaded into the insert 128. As best shown in FIG. 15, in some applications, the end 52 of the body 56 may be tapered during the fabrication process so as to cover the fitting 56h. Thus, the longitudinal and helical filaments 68, 70 essentially cover the outer surface of the ring 124 to form a rigid connection between the body 52 and the fitting 56h.

Figures 16, 17:
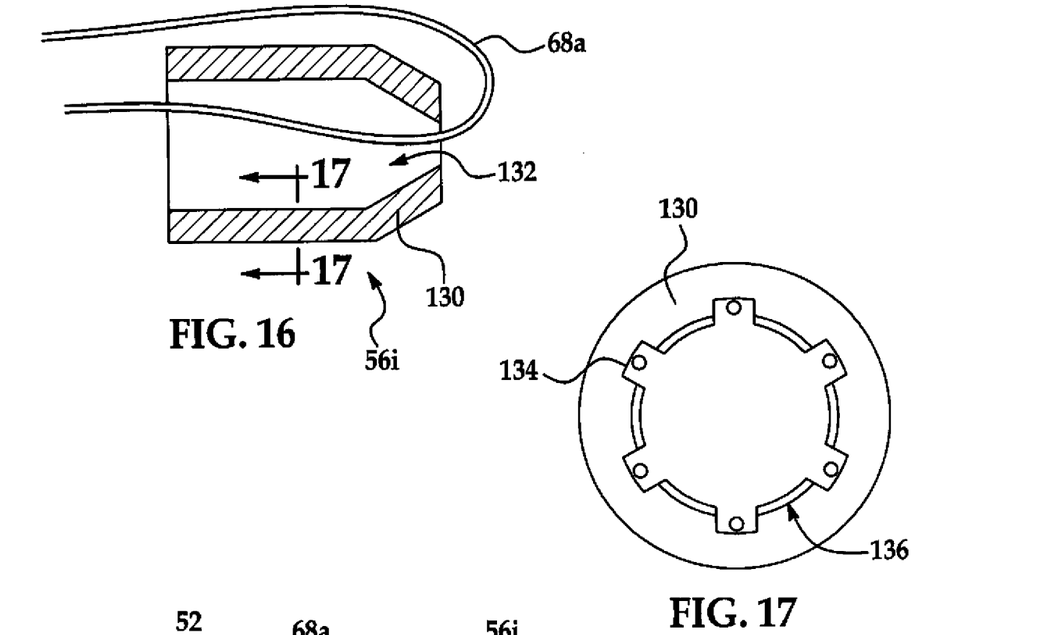
FIG. 16 is a sectional view illustrating another form of the fitting.
FIG. 17 is a sectional view taken along the line 17-17 in FIG. 16.

Attention is now directed to FIGS. 16 and 17 which depict another embodiment of the fitting 56i. A fitting member 130 formed of metal and/or composite materials includes a central bore 132 that is provided with a set of threads 136 for receiving the threaded shank 64 of a rod end 54, similar to that shown in FIG. 12. The fitting member 130 further includes a plurality of circumferentially spaced, longitudinally extending grooves 134. Filament extensions 68a are wrapped longitudinally around the fitting member 130 such that groups of the filament extensions 68a lie within the grooves 134.

Figure 18:
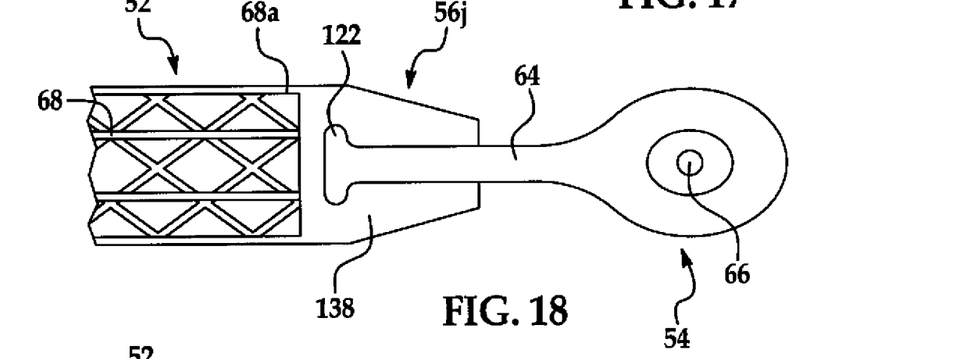
FIG. 18 illustrates, partially in section, one end of still another embodiment of the fitting.

FIG. 18 depicts a further embodiment of the fitting 56j in which a tapered plastic resin fitting member 138 is formed, as by molding, in the end of the body 52. The molded plastic resin from which the fitting member 138 is formed may extend into the end of the body 52, and may fill some of the voids between longitudinal and helical members 68, 70. If desired, some of the filament extensions 68a may be molded into the fitting member 138. A rod end 54 is molded within the fitting member 138, and includes a shank 64 having an enlarged portion 122 that anchors the rod end 54 in the fitting member 138.

Figure 19:
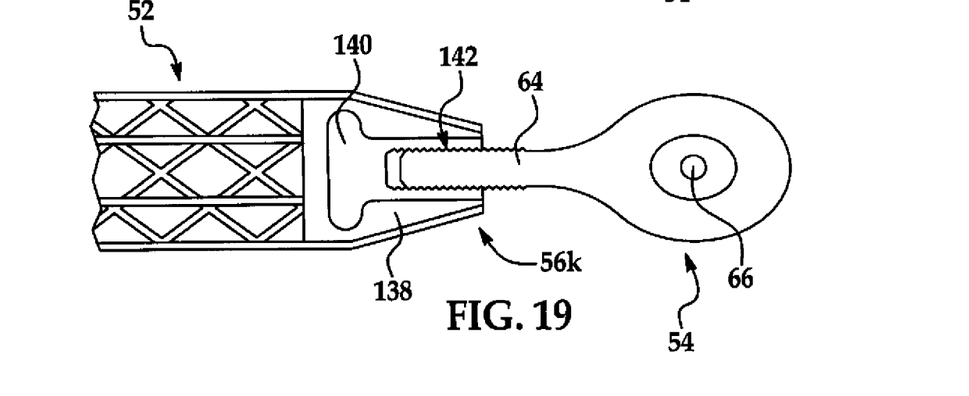
FIG. 19 is a sectional illustration of an alternate method for connecting the rod end in the fitting shown in FIG. 18.

FIG. 19 illustrates another embodiment of a fitting 56*k* that is similar to fitting 56*j* shown in FIG. 18, except that a metal insert 140 is molded into the plastic resin fitting member 138. The insert 140 is provided with a central threaded bore for receiving the threaded shank 64 of the rod end 54.

Figure 20:
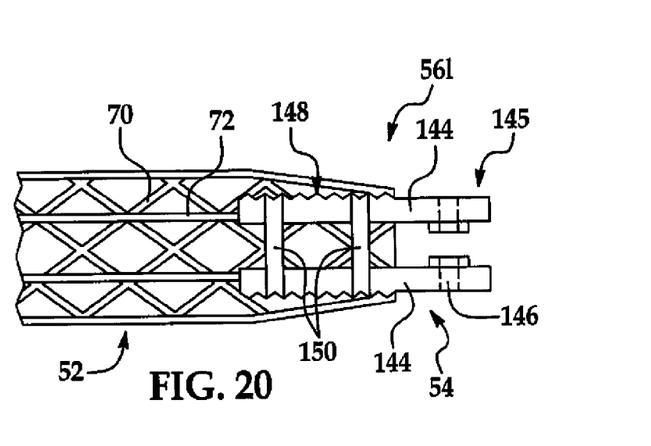
FIG. 20 is a side view illustrating another embodiment of the fitting having a rod end formed by a clevis.

Attention is now directed to FIG. 20 which illustrates a further embodiment of a fitting 56*l* which includes a pair of elongate, substantially flat plates 144 that are held in spaced apart relationship by a pair of spacer members 150. The plates 144 may each include a series of serrations 148 on an outer surface thereof over which the body 52 may be formed such that the longitudinal and helical members 68 70 are tightly wrapped over the serrations 148, thereby rigidly fixing the fitting 56*l* to the body 52. The outer extremities 145 of the plates 144 are each provided with a through hole fitting 146 that form a clevis-like attachment point on the tie rod 50.

Figure 21:
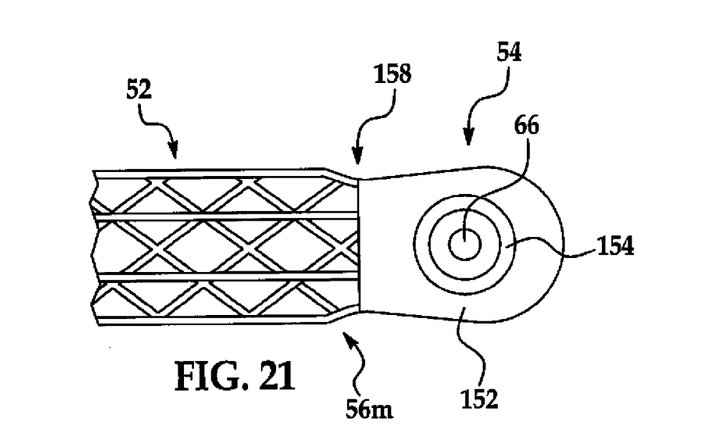
FIG. 21 is a side view illustration of a further embodiment of the tie rod having an integrally formed rod end.
Figure 22:
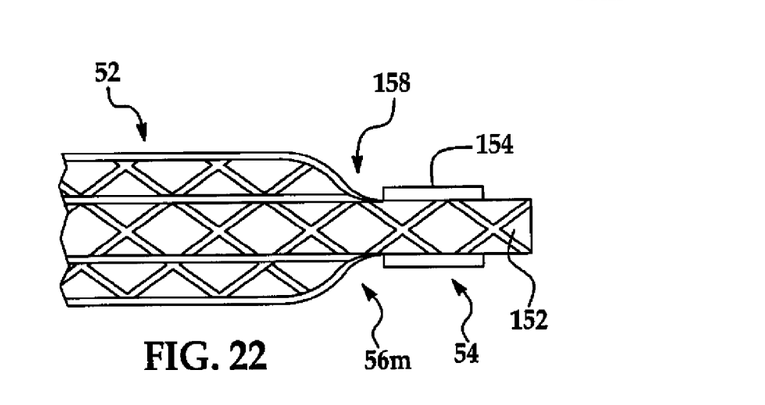
FIG. 22 is a top view illustration of the tie rod shown in FIG. 21.

Referring now to FIGS. 21 and 22, another embodiment of the fitting 56*m* is illustrated which has an integrally formed rod end 54. In this embodiment, the fitting 56*m* comprises a series of high density, pre-impregnated resin filament windings 152 forming an extension 158 of the body 52. The high density filament windings 152 may comprise continuous filaments that form extensions of the longitudinal and helical members 68 70 of the body 52, or may comprise separate filament windings that are attached to the end of the body 52. The high density filament windings 152 may be filled with a plastic resin (not shown) and then cured to form a consolidated structure that is integrated with the body 52. A rod end bearing cartridge 154 having a central eye 66 may be trapped tightly within the high density filament windings 152 in order to provide a rod end 54.

Figures 23, 24:
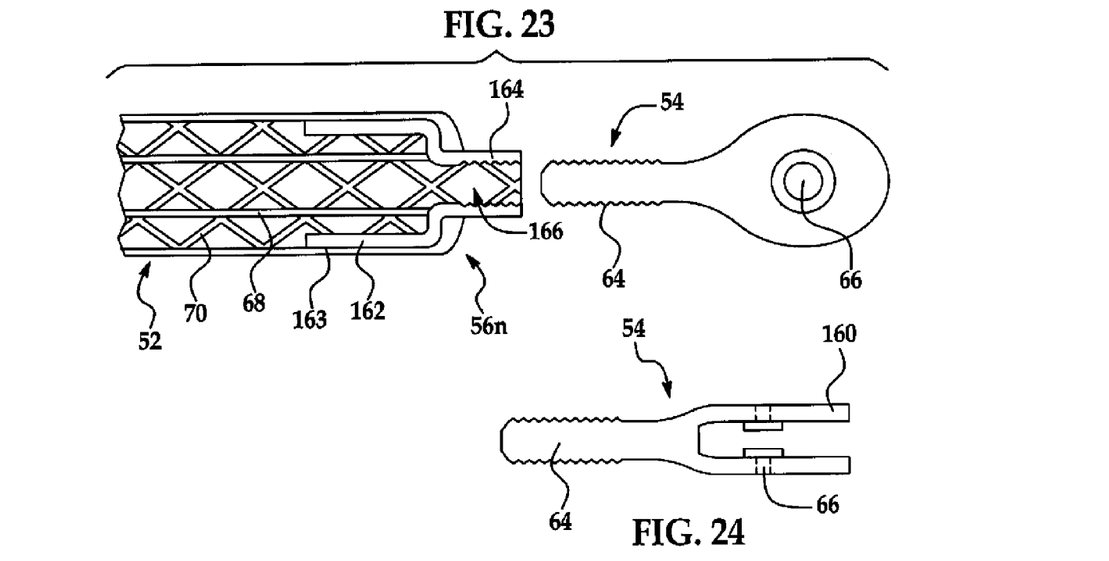
FIG. 23 is an exploded, side view illustration of a further embodiment of the tie rod.
FIG. 24 is a top view illustration of the rod end shown in FIG. 23.

Another embodiment of a fitting 56*n* is shown in FIGS. 23 and 24, in which a generally cylindrical metal member 162 having a tapered neck 164 with a threaded through hole 166 is disposed within an end of the body 52. In this example, the longitudinal and helical members 68, 70 are wound over the cylindrical member 162, including a portion of the neck 164 of the fitting 56*n*. The outer cylindrical surface 163 of the cylindrical member 162 may include serrations (not shown) for better gripping the longitudinal and helical members 68, 70. The threaded shank 64 of a rod end 54 is received within the threaded opening 166 in the neck 164. In this example, the rod end 54 is provided with a U-shaped clevis 160 having through holes 66 forming an attachment point on the tie rod 50.

Figure 25:
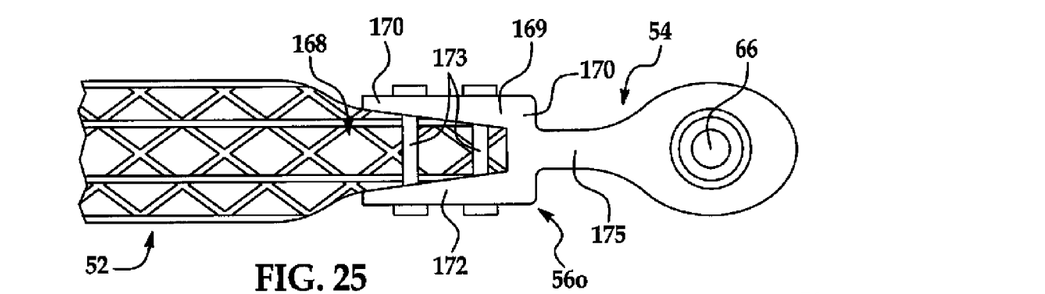
FIG. 25 is a side view illustration of a further embodiment of the tie rod.

Referring now to FIG. 25, a further embodiment of the fitting 56*o* is shown clamped on a tapered end section 168 of the body 52. The fitting 56*o* includes a fitting member 169 having a pair of tines 170, 172 that are connected by rods 173 which clamp the tines 170, 172 against the tapered end section 168. In this example, a rod end 54 is formed by a neck 175 on the fitting member 169 that includes an eye 66 forming an attachment point.

Figure 26:
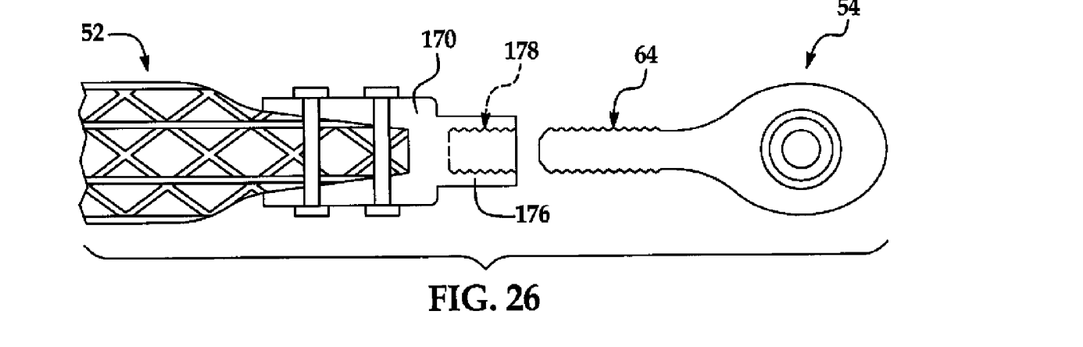
FIG. 26 is a side view illustration showing an alternate method for securing the rod end in the fitting shown in FIG. 25.

FIG. 26 illustrates a variation of the fitting 56*o* shown in FIG. 25. In this example, a neck portion 176 on the fitting member 169 includes a central threaded bore 178 for receiving the threaded shank 64 of the rod end 54. The threaded shank 64 and threaded bore 178 allow the rod end 54 to be longitudinally adjusted relative to the body 52.

Figure 27:
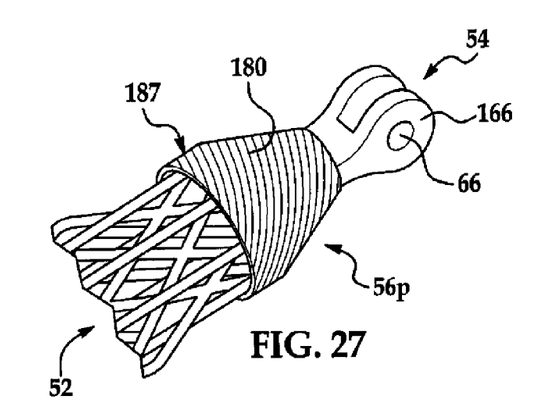
FIG. 27 is a perspective illustration of a further embodiment of the fitting.
Figure 28:
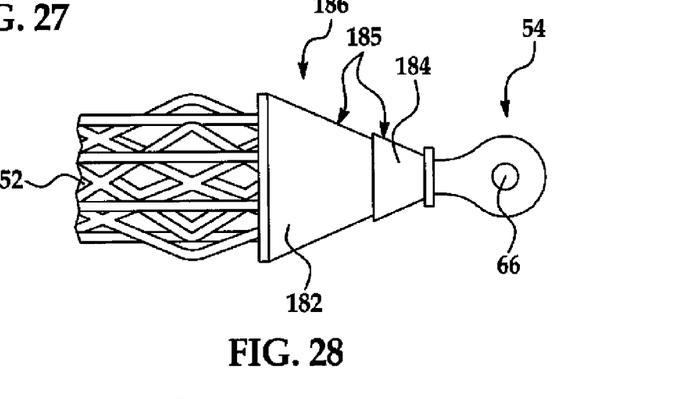
FIG. 28 is a side view illustration of the fitting shown in FIG. 27 before the mandrel is wrapped.

Attention is now directed to FIGS. 27 and 28 which illustrate a further embodiment of the fitting 56*p*. In this embodiment, a tapered end fitting 184 formed of metal and/or composite materials, includes a threaded central bore (not shown) for receiving a rod end 54. The end fitting 184 is coupled with the end of a cone shaped mandrel 182 so that the outer surfaces of the end fitting 184 and the mandrel 182 form a substantially continuous tapered surface 185 (FIG. 28). Composite fibers 180 such as carbon fiber epoxy tows are wrapped in a spiral or other geometrical pattern over the continuous surface 185 to form composite wrappings 187 (FIG. 27). The composite wrappings 187 are co-cured with the body 52 to form a rigid connection between the tapered end fitting 56*p* and the body 52. In one embodiment, the mandrel 182 may comprise a light weight plastic material having sufficient hoop strength to act as a winding mandrel that permanently remains beneath and strengthens the cured wrappings 187. However, in another embodiment, to reduce weight, the mandrel 182 may be formed of a material that may be dissolved away using a suitable solvent after the co-curing step, leaving the end fitting 184 and the cured wrappings 187.

Figure 29:
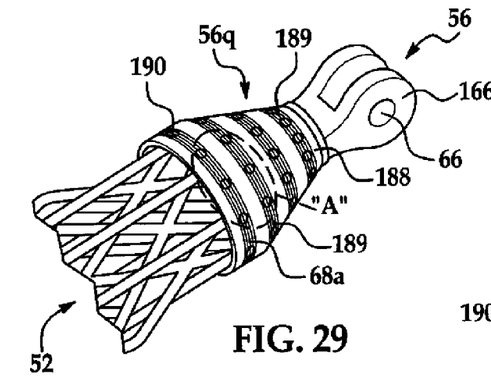
FIG. 29 is a perspective illustration of another embodiment of the tie rod.
Figure 30:
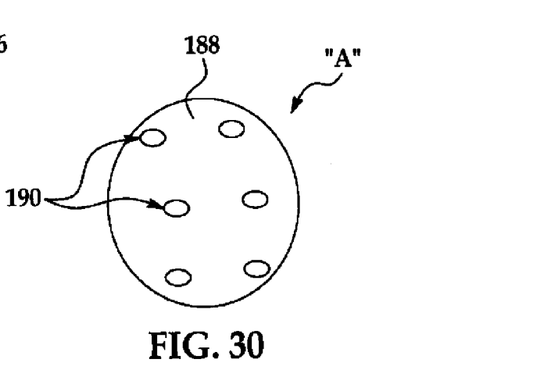
FIG. 30 is an enlarged illustration of the area designated as "A" in FIG. 29.

FIGS. 29 and 30 illustrate still another embodiment of a fitting 56*q* in which a tapered metal cone 188 is provided with a plurality of through hole openings 190 therein. Filament extensions 68*a* are woven through the openings 190 in order to fix the tapered cone 188 to the body 92. Although not shown in the drawings, the tapered 188 may be provided with a threaded insert therein for holding a rod end 56, similar to embodiments described above. The tapered cone 98 may comprise carbon or titanium, for example. Additional pre-impregnated fibers 189 may be wrapped around and over the filament extensions 68*a*.

Figures 31, 32, 33, 34:
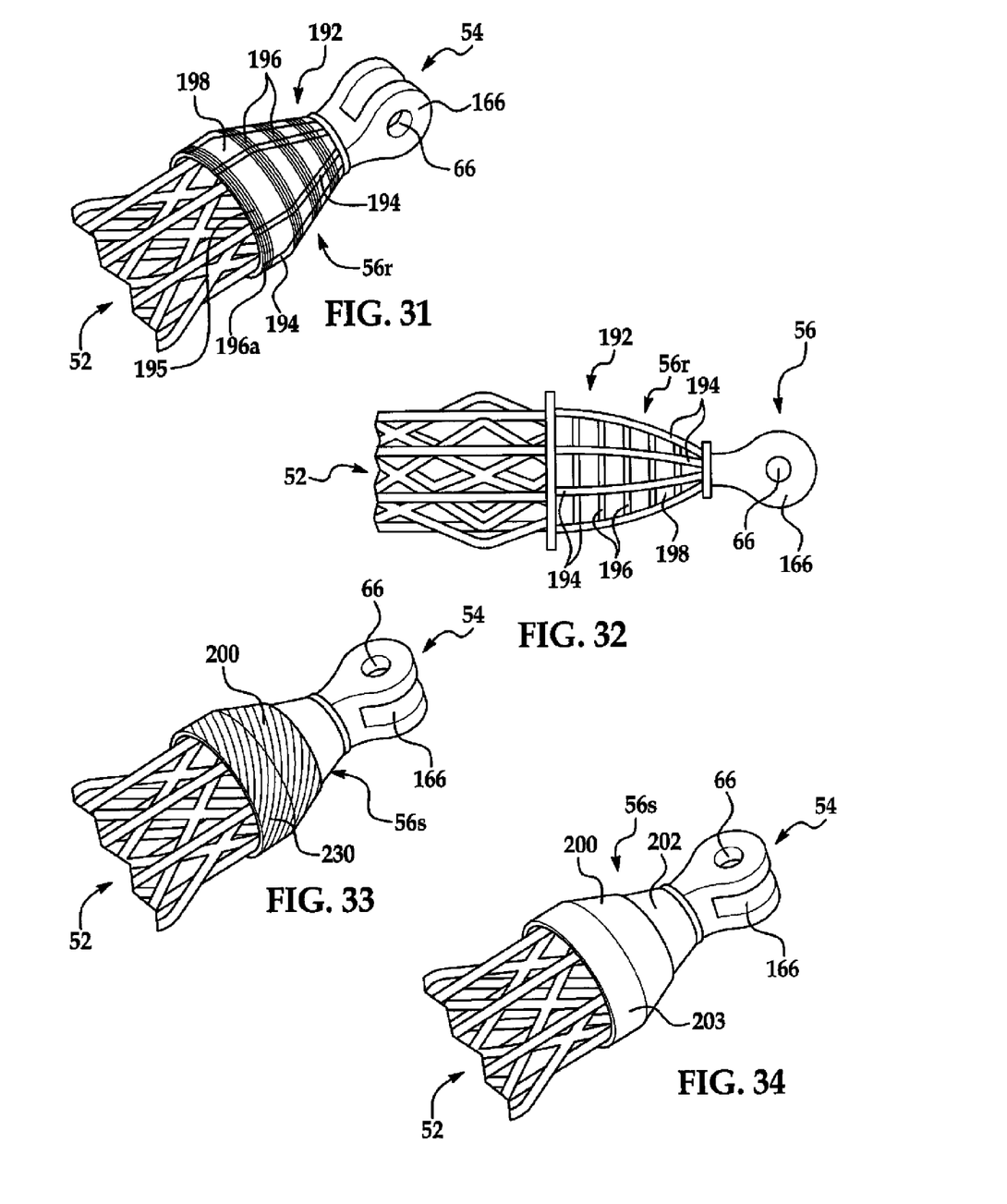
FIG. 31 is a perspective illustration of another embodiment of the fitting.
FIG. 32 is a side view illustration of the fitting shown in FIG. 31.
FIG. 33 is a perspective view of another embodiment of the fitting.
FIG. 34 is a view similar to FIG. 33, but following the installation of a cone.
Figure 35:
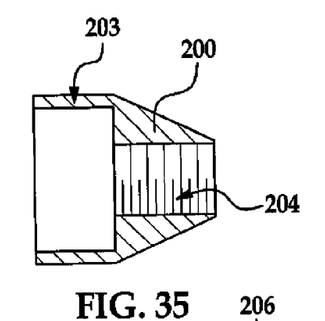
FIG. 35 is a sectional side view illustration of the cone shown in FIG. 34.
Figure 36:
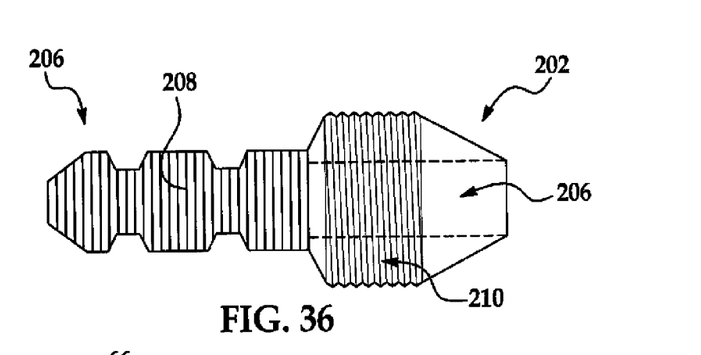
FIG. 36 is a side view illustration of a threaded center number forming part of the fitting shown in FIG. 33.

Referring now to FIGS. 31 and 32, another form of a fitting 56*r* is depicted. A bird cage cone 192 is formed by a plurality of circumferentially extending members 196 formed by wrappings of prepreg tows, and a plurality of circumferentially spaced, longitudinally extending pultruded carbon rods 194. The bird cage cone 192 may be joined to the body 52 by prepreg fiber wrappings 195 in a shoulder area 196*a*. A metal insert 198 captured in the end of the bird cage 192 receives an adjustable rod end 56. The bird cage cone 192 forms a particularly lightweight, high strength, rigid connection between the rod end 56 and the body 52.

Attention is now directed to FIGS. 33-36 which illustrate still another form of the fitting 56*s*. A center member 202 (FIG. 36) has a threaded central bore 203 for receiving an adjustable rod end 54 (FIGS. 33 and 34), which in this example comprises a clevis 166. The center member 202 includes a threaded cylindrical outer surface 210, and a reduced diameter portion 206 that is wrapped with prepreg fibers 208. A cone 200 has a central threaded bore 204 for receiving the center member 202, and includes a lower cylindrical shell 203 (FIGS. 34 and 35) that may be bonded to the body 52. The shell 203 and the body 52 may be wrapped with pre-preg fibers 203 as shown in FIG. 33, in order to rigidly fix the cone 200 to the body 52.

Figure 37:
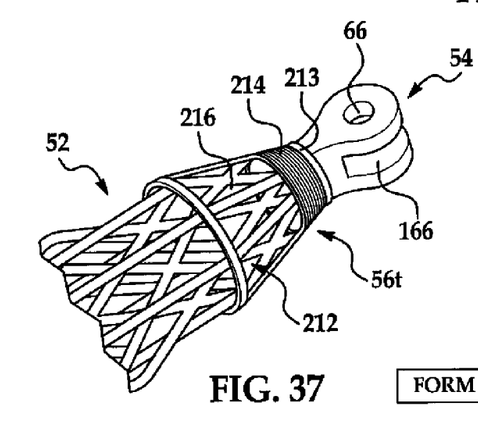
FIG. 37 is a perspective view illustrating a further embodiment of the tie rod.

FIG. 37 illustrates yet another embodiment of the fitting 56*t* in which each end of the body 52 is formed so as to transition into a tapered section 212. A metal insert 213 is disposed within the outer end of the tapered section 212 and may include a threaded bore (not shown) for receiving a rod end 54. A portion of the insert 213 and the tapered section 212 of the body 52 may be wrapped with prepreg fibers 214 such as carbon fiber epoxy tows in order to fix the tapered section 212 to the insert 213. The tapered section 212 of the body 52 may be formed over a dissolvable mandrel 216 that may assist in supporting the wrappings of prepreg fibers 214. The mandrel 216 may be dissolved away by a suitable solvent after the body and prepreg fibers 214 are co-cured.

Figure 38:
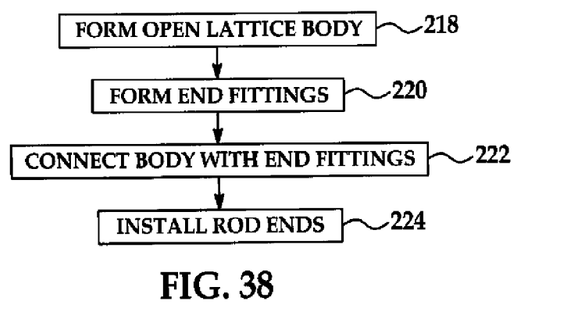
FIG. 38 is a broad flow diagram illustrating steps of a method for producing a composite tie rod.

FIG. 38 illustrates the steps of a method for producing a composite tie rod of the type described above. Beginning at 218, the body 52 of the tie rod 50 is formed by wrapping and interlacing pre-preg filaments over a mandrel (not shown). Next at 220, the end fittings 56 are formed by any of various techniques previously described. Then, at 222, the body 52 and the end fittings 56 are connected. Finally, at 224, the rod ends 54 may be installed in the end fittings 56.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of producing a composite tie rod, comprising:
   forming an open lattice composite body, including interlacing continuous filaments held in a matrix;
   securing a cap on an end of the open lattice composite body by fastening certain of the continuous filaments to the cap, wherein securing the cap includes one of: weaving the certain continuous filaments into the cap or wrapping the certain continuous filaments around the cap; and
   attaching a connector to the cap, wherein the connector is removably attached to the cap.

2. The method of claim 1, further comprising:
   removing the connector from the cap; and
   attaching a second connector to the cap, wherein the second connector and the first connector have differently shaped ends.

3. The method of claim 1, wherein securing the cap includes clamping a fitting onto the end of the open lattice composite body.

4. The method of claim 2 further comprising:
   attaching a third connector to the second connector, wherein the third connector is removably connected to the second connector, and wherein the first connector, the second connector, and the third connector have differently shaped ends.

5. A method of producing a composite tie rod, comprising:
   forming an open lattice composite body, including interlacing continuous filaments held in a matrix;
   securing a cap on an end of the open lattice composite body by fastening certain of the continuous filaments to the cap, wherein securing the cap includes clamping the certain continuous filaments within the cap; and
   attaching a connector to the cap, wherein the connector is removably attached to the cap, wherein the cap comprises grooves in an outside surface of the cap, wherein the grooves extend axially along the outside surface, and wherein at least some of the certain of the continuous filaments of the open lattice composite body extend into the grooves.

6. A method of producing a composite tie rod, comprising:
   forming an open lattice composite body, including interlacing continuous filaments held in a matrix;
   securing a cap on an end of the open lattice composite body by fastening certain of the continuous filaments to the cap, wherein the cap comprises bundles of fibers extending from the cap, and wherein securing the cap comprises co-curing the bundles of fibers with the certain of the continuous filaments;
   attaching a connector to the cap, wherein the connector is removably attached to the cap,
   removing the connector from the cap; and
   attaching a second connector to the cap, wherein the second connector and the first connector have differently shaped ends.

7. A method of producing a composite tie rod, comprising:
   forming an open lattice composite body, including interlacing continuous filaments held in a matrix;
   securing a cap on an end of the open lattice composite body by fastening certain of the continuous filaments to the cap, wherein securing the cap comprises wrapping the cap with composite fibers and co-curing the composite fibers and the certain of the continuous filaments;
   attaching a connector to the cap, wherein the connector is removably attached to the cap,
   removing the connector from the cap; and
   attaching a second connector to the cap, wherein the second connector and the first connector have differently shaped ends.

8. The method of claim 7 wherein the composite fibers are wrapped in a helical pattern.

9. The method of claim 7 wherein the composite fibers are wrapped in a direction substantially perpendicular to the certain of the continuous filaments.

* * * * *